Feb. 24, 1948.  J. P. TARBOX  2,436,620
BRACE FOR VEHICLES, ESPECIALLY FOR AUTOMOBILES
Filed Oct. 30, 1943  2 Sheets-Sheet 1

INVENTOR

*John P. Tarbox*

Feb. 24, 1948.                J. P. TARBOX                2,436,620
              BRACE FOR VEHICLES, ESPECIALLY FOR AUTOMOBILES
                    Filed Oct. 30, 1943         2 Sheets-Sheet 2
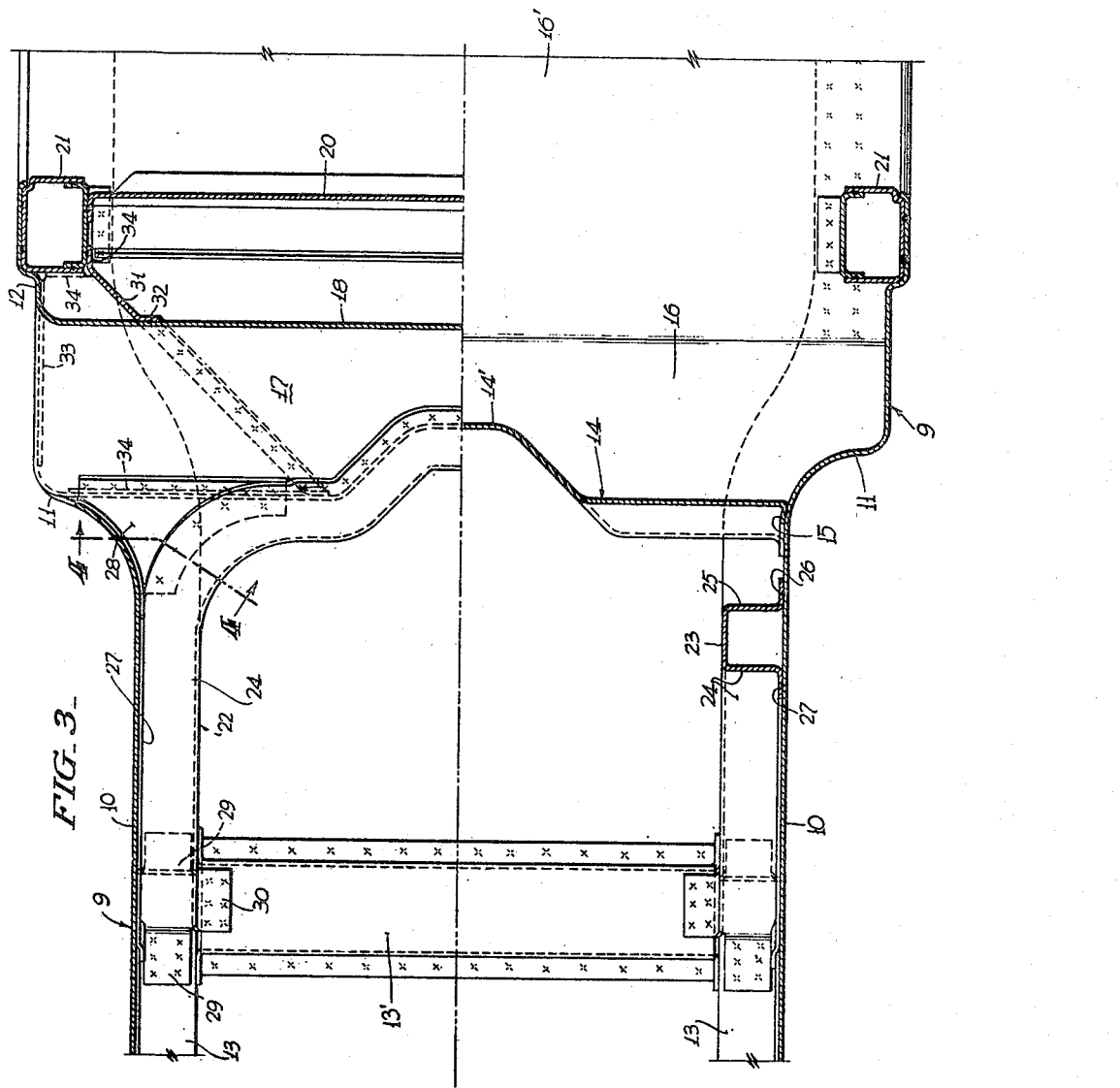
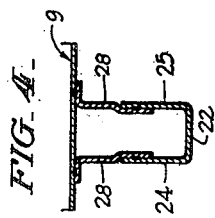
INVENTOR Patented Feb. 24, 1948

2,436,620

UNITED STATES PATENT OFFICE 2,436,620

BRACE FOR VEHICLES, ESPECIALLY FOR AUTOMOBILES

John P. Tarbox, Philadelphia, Pa., assignor to The Budd Company, Philadelphia, Pa., a corporation of Pennsylvania Application October 30, 1943, Serial No. 508,319

1 Claim. (Cl. 296—28)

The invention relates to a brace for reinforcing vehicle bodies and more particularly the ends of automobile bodies. More specifically, the invention relates to improvements in the type of brace disclosed in Patent No. 2,289,395, Theodore Ulrich, for End wall construction for vehicle bodies, issued July 14, 1942.

Among the objects of the invention is to provide a brace of the indicated type which is extremely strong yet light.

Another object of the invention is to provide a brace which requires, in spite of its strength, comparatively little room so that it does not impede the room required for the driving motor or other parts to be housed in the body, and which does not impede the accessibility of such motor or parts.

The aforesaid objects of the invention and further advantages are outstandingly achieved by use of an inclined brace arranged in the end compartment of an automobile and forming a closed box sectional girder with the walls to which it is attached.

The invention, its details and its advantages will be easily understood from the embodiment illustrated in the attached drawing and described in the following.

In the drawing:

Fig. 3 is above the center line a section along line 3—3 and below the center line a section along line 3—3' of Fig. 2 on a still larger scale.

Fig. 4 is a fragmentary section along line 4—4 of Fig. 3.

Figure 1:
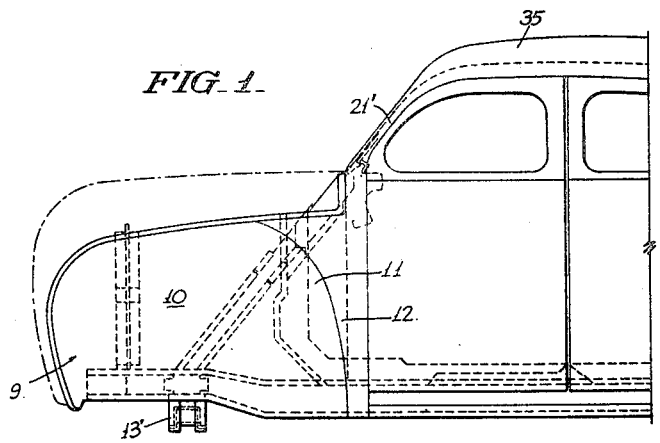
Fig. 1 is a diagrammatic side elevation of the front end of a combined automobile body and chassis frame structure.
Figure 2:
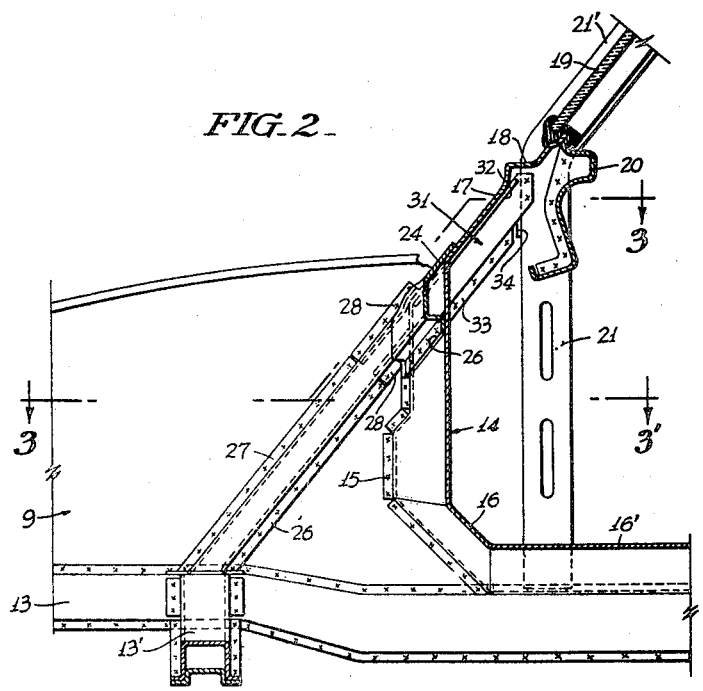
Fig. 2 is a fragmentary section on a larger scale along the longitudinal vertical center plane of the body shown in Fig. 1.

The illustrated body, preferably made of sheet metal, comprises side panels 9, each constituting a wheel housing skirt 10, a wheel housing crown 11 and a cowl side wall 12. The lower margins of these panels are attached to the flanges of laterally facing U-section sills 13. A dashboard 14 has its flanged vertical margins secured at 15 to the side panels 9 and separates the front compartment from the main compartment of the body. The panel 14 comprises a substantially vertical portion, a lower inclined toe board portion 16 which merges into the floor panel 16' and an upper rearwardly inclined portion 17 which merges into the top 18 of the cowl and the lower frame for the windshield 19. The rear margin of the cowl top and frame member 18 is secured to the top margin of the instrument board 20.

Box sectional door posts 21 have their lower ends secured to the sills 13. The outer sides of the posts 21 are overlapped by and secured to the rear margins of the cowl sides 12. The ends of the instrument board 20 are secured to the inner sides of the posts 21. The middle portion of panel 14 is rearwardly recessed at 14'.

The side sills 13 are interconnected at some distance in front of the panel 14 by a transverse sill 13'.

The side panels 9 and the dashboard 14 are reinforced and mutually interbraced by a brace structure 22. This brace structure 22 has the general form of an inverted U and is arranged in a plane extending from about the connection between the side sills 13 and the cross sill 13' upwardly and rearwardly and coinciding preferably approximately with the plane defined by the inclined upper portions 21' of the front posts.

The brace structure 22 is throughout its length U-shaped in cross section with a bottom wall 23 and an upper side wall 24 and a lower side wall 25. The wall 25 overlaps and is secured substantially throughout its length to the skirts 10 and the dashboard 14 by a lateral flange 26. The upper wall 24 is connected in the same manner to the skirt 10 by flanges 27. In the space between the side walls, the upper wall 24 overlaps with its rear margin the front margin of the panel portion 17 and is secured thereto as by spot welding. In the corners between the side walls 9 and the dashboard 14 corner pieces 28 are provided which widen the walls 24 and 25 so as to avoid difficulties in the manufacture of the structure 22. The attachment of the pieces 28 by overlapping portions and by spot welding is clearly indicated in the drawing.

The lower ends of the structure 22 are secured by tongues 29 and 30 to the top walls of the side sills 13 and the cross sill 13', respectively.

A bracket 31 is inserted on each side of the body between the dashboard 14 and the adjacent post 21. The brackets are angle shaped in cross section and are attached by marginal flanges 32, 33 and 34 to the cowl side wall 12, the inclined transverse panel portion 17, the dashboard 14 and the posts 21 so that they form together with said members closed box section extensions of the side arms of the structure 22.

The side arms of the structure 22, together with the side panels 9, the brackets 31, the panel portion 17 and the upper post portions 21 constitute in effect substantially straight inclined beams which transmit stresses from the sills 13, 13' of the under frame structure into the roof structure 35. The attachment of the lower ends of the structure 22 is preferably in the region of the wheels (not shown).

The brace structure 22 requires but very little space so that it does not crowd the motor if arranged in a motor compartment or, does not detract considerably from the storage space if arranged, for instance at the rear end of a vehicle, in a luggage compartment.

The brace structure 22 forms also an effective transverse and diagonal brace between the side walls, and between the side walls and the dashboard.

The invention is, of course, not restricted to the illustrated embodiment. For instance, the form of the brace has to be adapted to the particular form of the body or its end compartment to which it is applied. All modifications are intended to be covered by the attached claim.

What is claimed is:

In a vehicle body, an end compartment comprising side walls and a transverse partition between the end compartment and the adjoining main compartment; a brace structure of inverted U-form having its side arms arranged along the side walls and its middle portion along the transverse partition and extending in a transverse plane which is upwardly inclined from near the lower margin of the body toward the transverse vertical middle plane of the body, the brace structure having U-section arms and a middle portion, the open sides of the U-sections facing, being closed by and having their margins secured to said side panels and said partition, respectively.

JOHN P. TARBOX.

REFERENCES CITED

The following references are of record in the file of this patent:

UNITED STATES PATENTS

| Number | Name | Date |
|---|---|---|
| 2,157,649 | Eksergian | May 9, 1939 |
| 2,193,949 | Tibbetts | Mar. 19, 1940 |
| 2,225,976 | Cadwallader | Dec. 24, 1940 |
| 2,289,395 | Ulrich | July 14, 1942 |
| 2,380,031 | Deisley et al. | July 10, 1945 |
| 2,386,280 | Ulrich | Oct. 9, 1945 |

FOREIGN PATENTS

| Number | Country | Date |
|---|---|---|
| 163,742 | Switzerland | Sept. 22, 1932 |
| 415,743 | Great Britain | Aug. 27, 1934 |
| 450,421 | Germany | Oct. 10, 1927 |